United States Patent
Evatt et al.

(10) Patent No.: US 11,975,394 B2
(45) Date of Patent: *May 7, 2024

(54) POCKET HOLE JIG

(71) Applicant: TECHTRONIC CORDLESS GP, Anderson, SC (US)

(72) Inventors: Thomas Evatt, Six Mile, SC (US); Clinton C. Thackery, Clemson, SC (US); James Keith, Pickens, SC (US)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/708,997

(22) Filed: Mar. 30, 2022

(65) Prior Publication Data

US 2022/0219250 A1 Jul. 14, 2022

Related U.S. Application Data

(60) Continuation of application No. 17/060,597, filed on Oct. 1, 2020, now Pat. No. 11,318,545, which is a (Continued)

(51) Int. Cl.
*B23B 47/28* (2006.01)

(52) U.S. Cl.
CPC ........ *B23B 47/287* (2013.01); *B23B 2247/10* (2013.01); *B23B 2247/12* (2013.01); *B23B 2260/0487* (2013.01)

(58) Field of Classification Search
CPC ..... B23B 47/28; B23B 47/287; B23B 47/288; B23B 2247/10; B23B 2247/12; B23B 2260/487

See application file for complete search history.

(56) References Cited

U.S. PATENT DOCUMENTS

| 5,337,641 A | 8/1994 | Duginske |
| 5,676,500 A | 10/1997 | Sommerfeld |

(Continued)

FOREIGN PATENT DOCUMENTS

| CA | 2506924 A1 | 11/2005 |
| CN | 2892425 Y | 4/2007 |

(Continued)

OTHER PUBLICATIONS

Chinese Patent Office Action for Application No. 201810101260.6 dated May 21, 2020 (10 pages including English translation).

*Primary Examiner* — Eric A. Gates
(74) *Attorney, Agent, or Firm* — Michael Best & Friedrich LLP

(57) ABSTRACT

A pocket hole jig includes a base having a first end, a second end, and a longitudinal axis extending therebetween. The base further including a drill bit aperture positioned proximate the first end and extending through a portion of the base. The drill bit aperture oriented at an acute angle relative to the longitudinal axis. The pocket hole jig further includes a fence pivotally coupled to the base proximate the second end of the base. The fence including a contact surface, and the fence pivotal about an axis transverse to a longitudinal axis of the drill bit aperture.

17 Claims, 12 Drawing Sheets

Related U.S. Application Data division of application No. 16/449,860, filed on Jun. 24, 2019, now Pat. No. 10,828,704, which is a continuation of application No. 15/883,261, filed on Jan. 30, 2018, now Pat. No. 10,357,831.

(60) Provisional application No. 62/515,862, filed on Jun. 6, 2017, provisional application No. 62/453,086, filed on Feb. 1, 2017.

(56) References Cited

U.S. PATENT DOCUMENTS

| | | | |
|---|---|---|---|
| 5,954,461 A * | 9/1999 | Lemieux | B23B 47/288 408/115 R |
| 6,283,685 B1 | 9/2001 | Lemieux | |
| 6,481,937 B1 | 11/2002 | Sommerfeld | |
| 6,637,988 B1 | 10/2003 | Park | |
| 6,726,411 B2 | 4/2004 | Sommerfeld | |
| D528,930 S | 9/2006 | Degen | |
| 7,641,425 B2 * | 1/2010 | Sommerfeld | B23B 49/005 408/67 |
| 7,798,750 B2 | 9/2010 | Clark | |
| 7,967,534 B2 | 6/2011 | McDaniel et al. | |
| 7,976,252 B2 | 7/2011 | McDaniel et al. | |
| 8,029,214 B2 | 10/2011 | McDaniel et al. | |
| 8,052,358 B2 | 11/2011 | McDaniel et al. | |
| RE44,289 E | 6/2013 | Park | |
| 10,357,831 B2 | 7/2019 | Evatt et al. | |
| 10,828,704 B2 | 11/2020 | Evatt et al. | |
| 11,090,734 B1 * | 8/2021 | Hall | B23B 47/288 |
| 2003/0123941 A1 | 7/2003 | Emerson | |
| 2008/0187404 A1 | 8/2008 | Chiang | |
| 2009/0053003 A1 | 2/2009 | Clark | |
| 2017/0297119 A1 | 10/2017 | Chang | |

FOREIGN PATENT DOCUMENTS

| | | | |
|---|---|---|---|
| DE | 202007017132 U | 2/2008 | |
| EP | 0329068 B1 | 8/1989 | |
| EP | 1311364 B1 | 5/2003 | |
| EP | 1595627 B1 | 11/2005 | |
| EP | 1862242 B1 | 12/2007 | |
| EP | 1862243 B1 | 12/2007 | |
| EP | 1862244 B1 | 12/2007 | |
| EP | 2174737 B1 | 4/2010 | |
| EP | 2179809 B1 | 4/2010 | |
| EP | 2179810 B1 | 4/2010 | |
| EP | 2223761 B1 | 9/2010 | |
| EP | 2223762 B1 | 9/2010 | |
| GB | 2406534 A * | 4/2005 | B23B 47/288 |

* cited by examiner

POCKET HOLE JIG

CROSS-REFERENCE TO RELATED APPLICATIONS

This application is a continuation of U.S. patent application Ser. No. 17/060,597, filed on Oct. 1, 2020, which in turn is a divisional of U.S. patent application Ser. No. 16/449,860, filed on Jun. 24, 2019 (now U.S. Pat. No. 10,828,704), which in turn is a continuation of U.S. patent application Ser. No. 15/883,261, filed on Jan. 30, 2018 (now U.S. Pat. No. 10,357,831), which in turn claims priority to U.S. Provisional Patent Application No. 62/453,086, filed on Feb. 1, 2017, and to U.S. Provisional Patent Application No. 62/515,862, filed on Jun. 6, 2017, the entire contents all of which are incorporated herein by reference.

FIELD OF THE INVENTION

The present invention relates to pocket hole jigs, and particularly to a pocket hole jig having a fence for aligning the pocket hole jig to a workpiece.

BACKGROUND OF THE INVENTION

Pocket hole jigs are commonly used to facilitate locating and drilling pocket holes in a workpiece. Known pocket hole jigs lack a means for accurately positioning the jig with respect to either of an end or a face of a workpiece.

SUMMARY OF THE INVENTION

The present invention provides, in one aspect, a pocket hole jig for locating pocket holes in a workpiece. The pocket hole jig includes a base with a base plate and first and second lateral side walls extending along the base plate, a body disposed between the first and second lateral side walls and slidable along the base in a first direction and a second direction opposite the first direction, the body including a drill bit aperture angled relative to the base plate, and a fence movable between a raised position and a lowered position. The fence including a first contact surface and a second contact surface opposite the first contact surface. The fence is pivotally coupled to the base. With the body in a position relative to the base, the first contact surface is engageable with a end of the workpiece with the fence in the lowered position to place the base a predetermined distance from the end of the workpiece, and, with the body in the position relative to the base, the second contact surface is engageable with a face of a second workpiece abutting the end of the workpiece with the fence in the raised position to place the base the predetermined distance form the end of the workpiece.

The present invention provides, in another aspect, a pocket hole jig for locating pocket holes in a workpiece. The pocket hole jig includes a base having a first end, a second end, and a longitudinal axis extending therebetween. The base further including a drill bit aperture positioned proximate the first end and extending through a portion of the base. The drill bit aperture oriented at an acute angle relative to the longitudinal axis. The pocket hole jig further includes a fence pivotally coupled to the base proximate the second end of the base. The fence including a contact surface, and the fence pivotal about an axis transverse to a longitudinal axis of the drill bit aperture.

The present invention provides, in another aspect, a pocket hole jig for locating pocket holes in a workpiece. The pocket hole jig includes a base having a forwardmost end defining a generally planer front surface and a drill bit aperture positioned opposite the forwardmost end. The drill bit aperture oriented at an acute angle relative to a longitudinal axis of the base. The pocket hole jig further includes a fence having a contact surface pivotally coupled to the base proximate the forwardmost end. The contact surface pivotal between a raised position and a lowered position, and the contact surface disposed rearward of the forwardmost end when in the raised position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
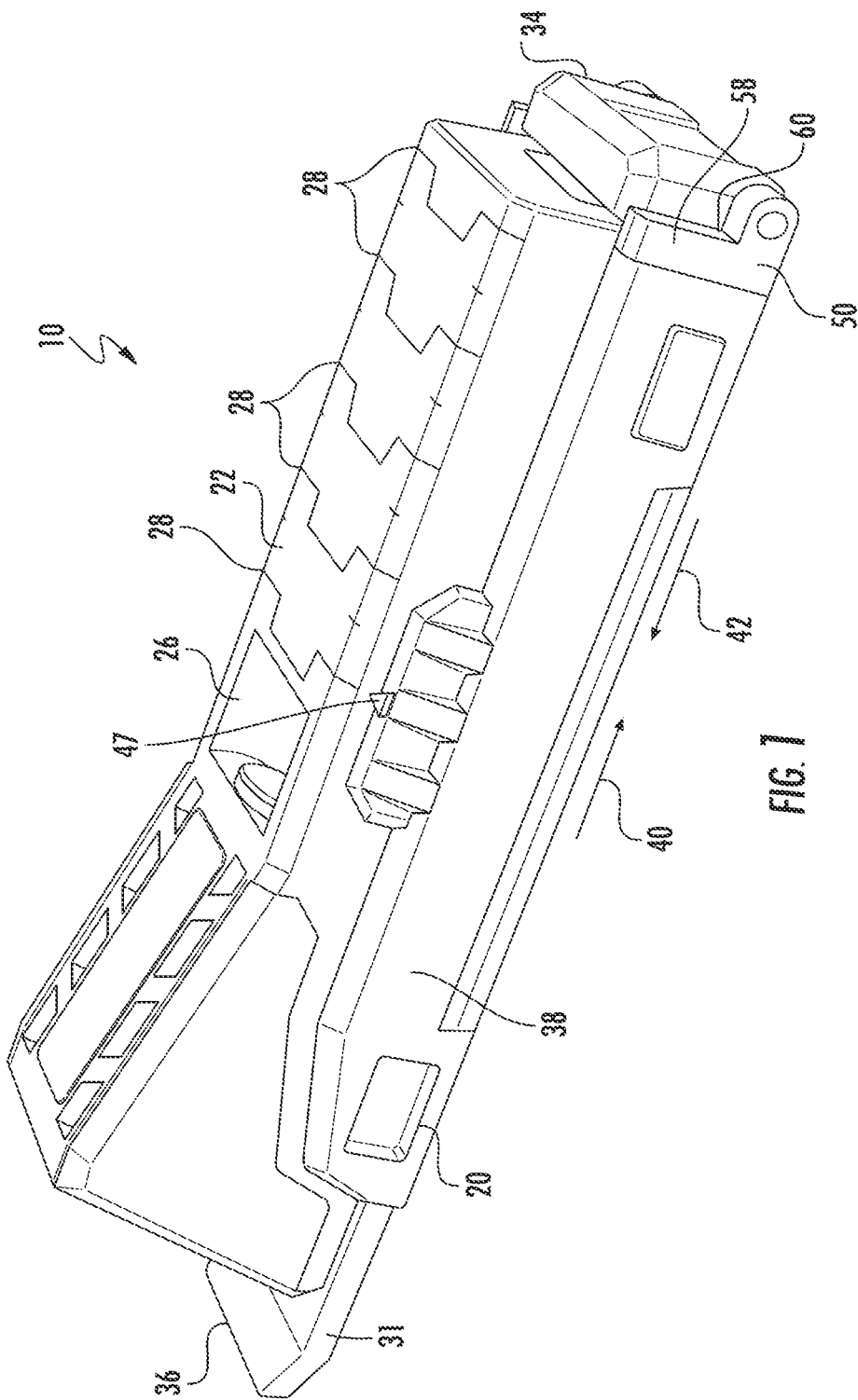
FIG. 1 is a perspective view of a pocket hole jig according to an embodiment of the invention.
Figure 6:
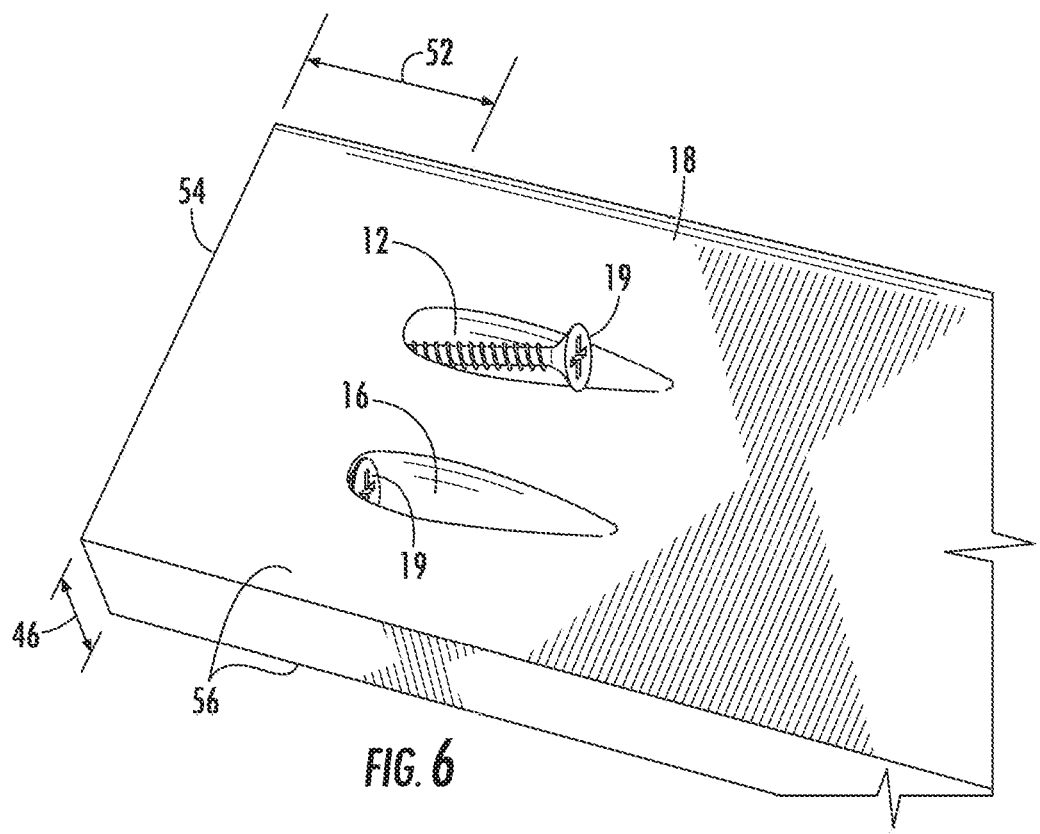
FIG. 6 is a perspective view of a first workpiece including pocket holes formed using the pocket hole jig of FIG. 1.

FIG. 1 is a perspective view of a pocket hole jig 10 according to one embodiment. The jig 10 can be used to properly locate and facilitate drilling pocket holes 12, 16 in a workpiece 18, such as a piece of wood (FIG. 6). The holes 12, 16 each receive a pocket screw 19 that is used to attach the workpiece 18 to a second workpiece.

Figure 3:
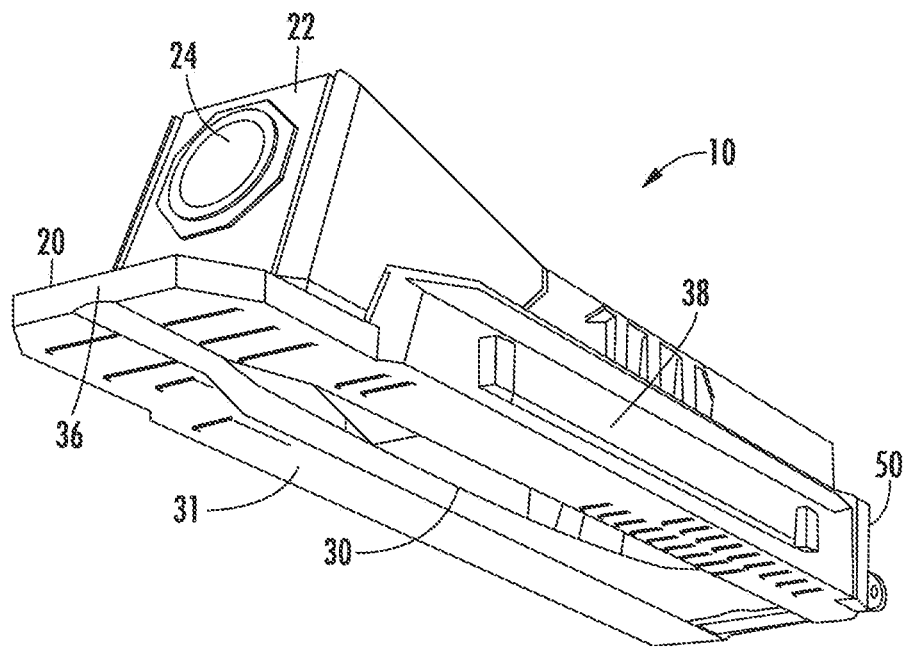
FIG. 3 is an alternative perspective view of the pocket hole jig of FIG. 1.

Referring to FIG. 1, the jig 10 includes a base 20 and a body 22 movable relative to the base 20. The body 22 includes a drill bit aperture 24 (FIG. 3), a window 26, and indicia 28. The aperture 24 is angled downwardly toward the base 20 at an oblique angle and is shaped and sized to receive and guide a drill bit. When a drill bit is inserted through the aperture 24, the bit extends through an aperture 30 (FIG. 3) in the base 20 to drill into the workpiece 18. The window 26 is provided so that a user can see the drill bit traveling through the aperture 24 and into the workpiece and so that debris (e.g., wood chips) created by the drill bit can exit the jig 10. The aperture 30 and the window 26 are in communication with, or intersect, the drill bit aperture 24.

The base 20 includes a base plate 31 and a generally U-shaped front wall 32 extending upward from the base plate 31. The front wall 32 has a generally planer front surface 34, which is also the forwardmost or front surface of the base 20. A back end 36 of the base 20 does not include a wall, such that the back end 36 is open. Lateral side walls 38 extend upward from the base plate 31, from the front wall 32 toward the back end 36.

The body 22 is disposed between the lateral side walls 38 such that the body 22 can slide forward (i.e. in the direction of arrow 40) and rearward (i.e. in the direction of arrow 42) relative to the base 20 (FIG. 1). Forward movement of the body 22 is limited by the front wall 32, while the open back end 36 permits the body 22 to be completely withdrawn from the base 20. In some embodiments, a retaining member (e.g., a projection) may limit rearward movement of the body 22 to prevent the body from being separated from the base 20.

Friction between the base 20 and body 22 holds the body 22 in position relative to the base 20 until the user exerts sufficient force to slide the body 22. In some embodiments, the body 22 may include a projection or projections and the base 20 may include a series of recesses that receive the projection(s) to releasably hold the body 22 in the desired position relative to the base 20. The sides 38 each include a marking 47 (e.g., an arrow in illustrated embodiment). The marking 47 and indicia 28 of the body 22 indicate to the user the relative position of the body 22 relative to the base 20. The indicia 28 include a plurality of lines that each correspond to a particular thickness 46 (FIG. 6) of the workpiece 18 (e.g., ¾ inch, 1 inch, 1¼ inch, etc.). That is, the user can position the body 22 relative to the base 20 by aligning the arrow 47 to the indicia 28 that corresponds to the thickness 46 of the workpiece 18.

The base 20 further includes a fence 50. The fence 50 aids the user in quickly and accurately positioning the jig 10 a correct distance 52 from an end 54 of the workpiece 18 (FIG. 6). The distance 52 and setting of arrow 47 and indicia 28 to the thickness 46 of the workpiece 18 are important so that the screw 19 exits the workpiece 18 through the end 54 of the workpiece 18 rather than through a face 56 of the workpiece 18.

Figure 2:
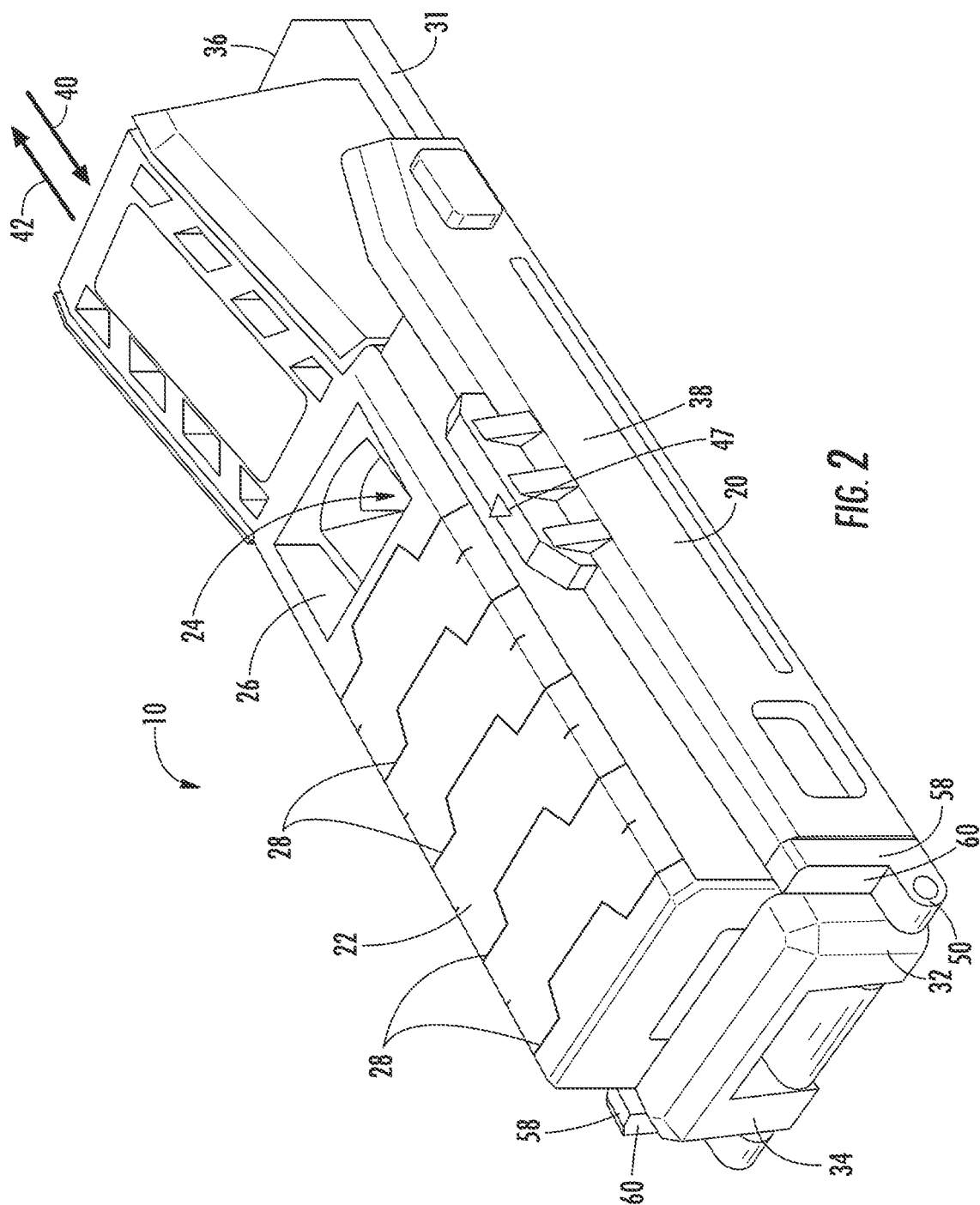
FIG. 2 is an alternative perspective view of the pocket hole jig of FIG. 1.
Figure 4:
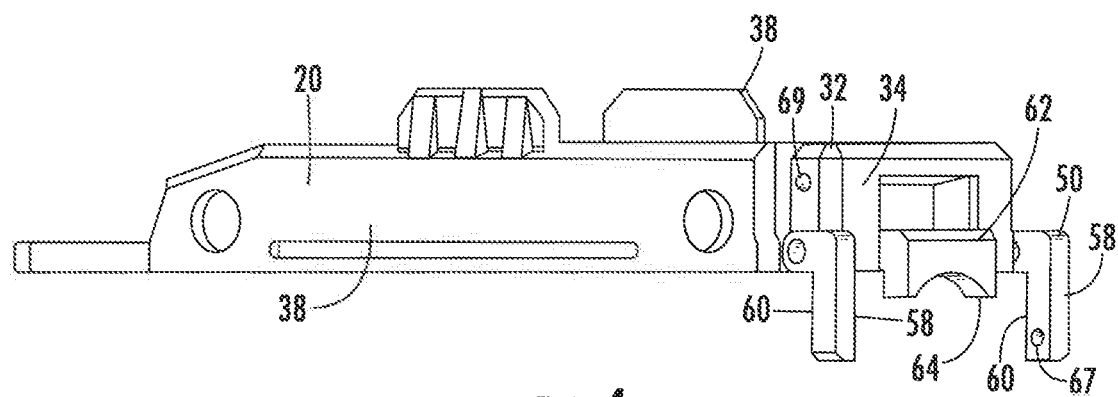
FIG. 4 is a perspective view of a base of the pocket hole jig of FIG. 1 illustrating a fence in a lowered position.
Figure 5:
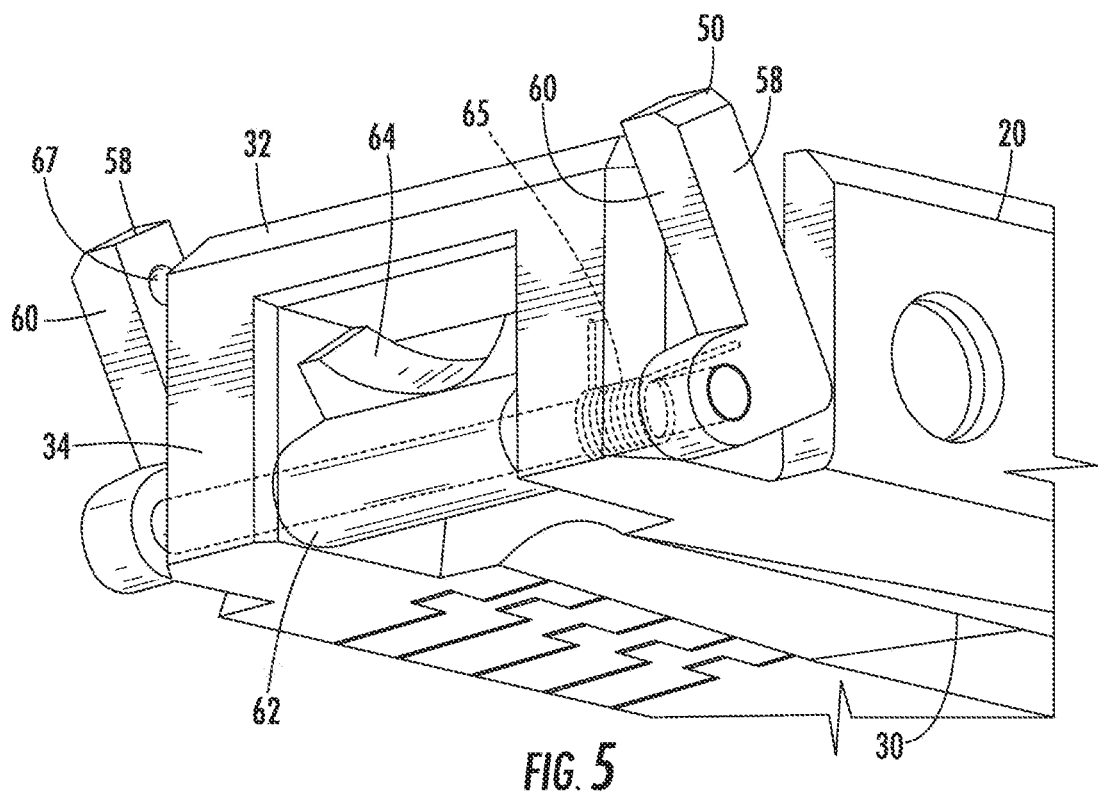
FIG. 5 is an alternative perspective view of the base of FIG. 4 illustrating the fence between the lowered position and an upward position.

Referring to FIGS. 2, 4, and 5, the fence 50 is pivotally attached to the front end 34 of the base 20. The fence 50 is pivotable between a first or raised position (FIG. 2) and a second or lowered position (FIG. 4). The fence 50 includes legs 58 with contact surfaces 60. When the fence 50 is in the lowered position, the contact surfaces 60 are coplanar with the front surface 34 of the front wall 32. Due to the pivot position of the fence 50, the contact surfaces 60 are brought both down and forward when the fence 50 is moved to the lowered position. In other words, the contact surfaces 60 occupy a first position when the fence 50 is in the raised position and a second position when the fence 50 is in the lowered position. The second position is forward of the first position.

The illustrated fence 50 further includes a center portion 62 having a recess 64. The recess 64 keeps the fence 50 clear from the path of the drill bit when the fence 50 is in the lowered position. In some embodiments, the fence 50 may be spring biased toward either the lowered position or the upward position, such as by a torsion spring 65. Alternatively, the fence 50 may be spring biased toward both the lowered position and the upward position, such as by an over-center spring. In some embodiments, a detent 69 may be used to retain the fence 50 in either or both the downward and upward positions until the user pivots the fence 50.

In operation, when the fence 50 is in the lowered position (FIG. 4) the jig 10 can be used for locating pocket holes 12, 16 (FIG. 6). The jig 10 is placed on the face 56 of the workpiece 18 so that the base 20 rests on the face 56. The distance 52 is set by the fence 50. More specifically, the contact surfaces 60 of the legs 58 of the fence 50 are placed in contact with the end 54 of the workpiece 18. This positions the jig 10 the correct distance 52 from the end 54. The user can then drill the hole 12 by inserting the drill bit through drill bit aperture 24 and advancing the drill bit the desired distance. To drill another hole 16, the user repositions the jig 10 on the face 56 to drill the hole 16 in the same manner. Thus, the fence 50 advantageously allows multiple pocket holes 12, 16 to be drilled at the same distance 52 from the end 54, and the distance 52 is properly calibrated such that the pocket holes 12, 16 intersect the end 54 of the workpiece 18.

Figure 7:
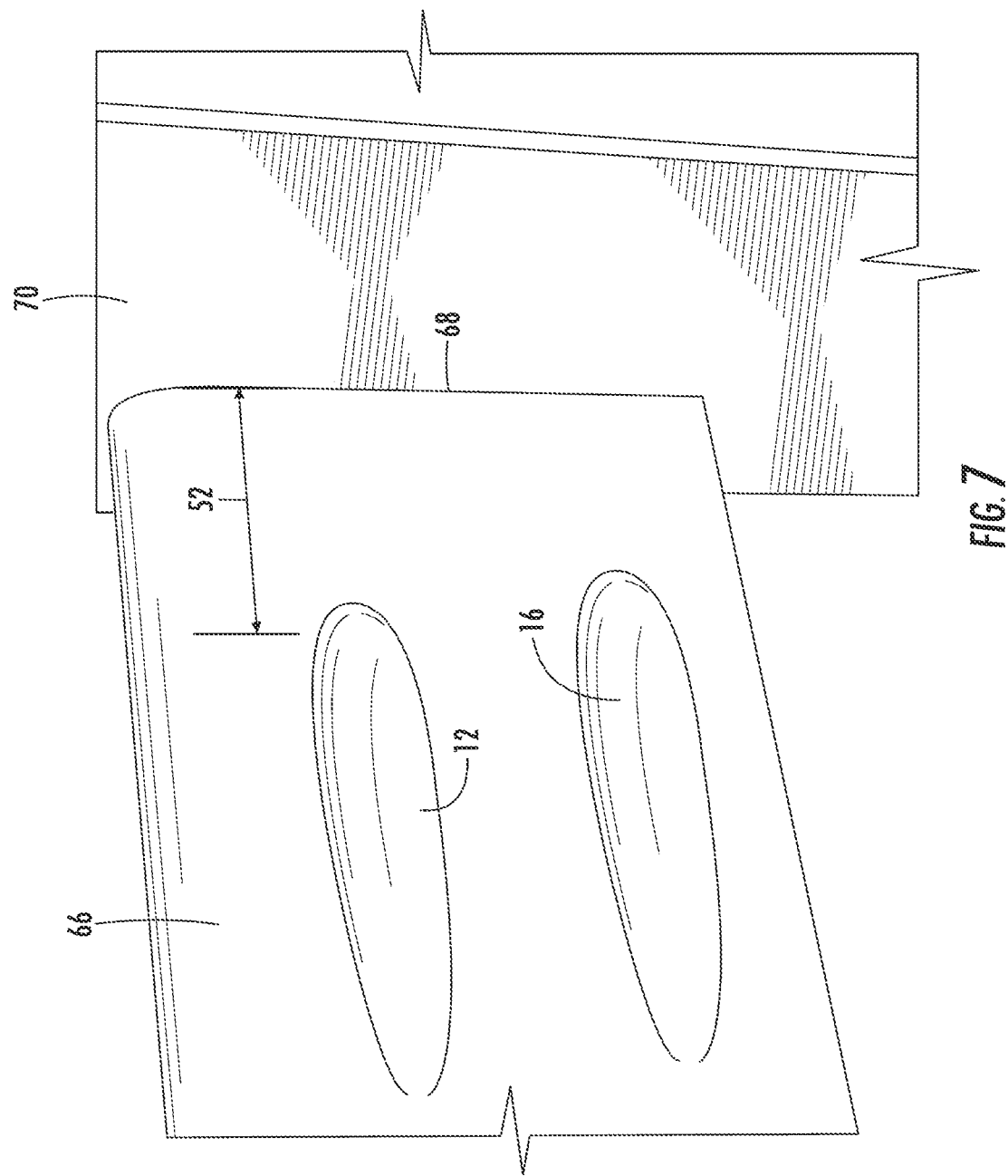
FIG. 7 is a perspective view of a second workpiece including pocket holes formed using the pocket hole jig of FIG. 1.

In some applications, such as that illustrated in FIG. 7, a workpiece 66 does not have a free end 68 over which to hang the legs 58 of the fence 50 like the end 54 of the workpiece 18 of FIG. 6. In such applications, the fence 50 is placed in the raised position shown in FIG. 2. Then, the front surface 34 is aligned with the end 68 of the workpiece 66 to set the jig 10 at the correct distance 52. In the application shown in FIG. 7, a second workpiece 70 is located at the end 68 of the first workpiece 66. Therefore, the front surface 34 can simply be abutted against the second workpiece 70 to properly position the jig 10 the distance 52 for locating pocket screw holes 12, 16.

Figure 8:
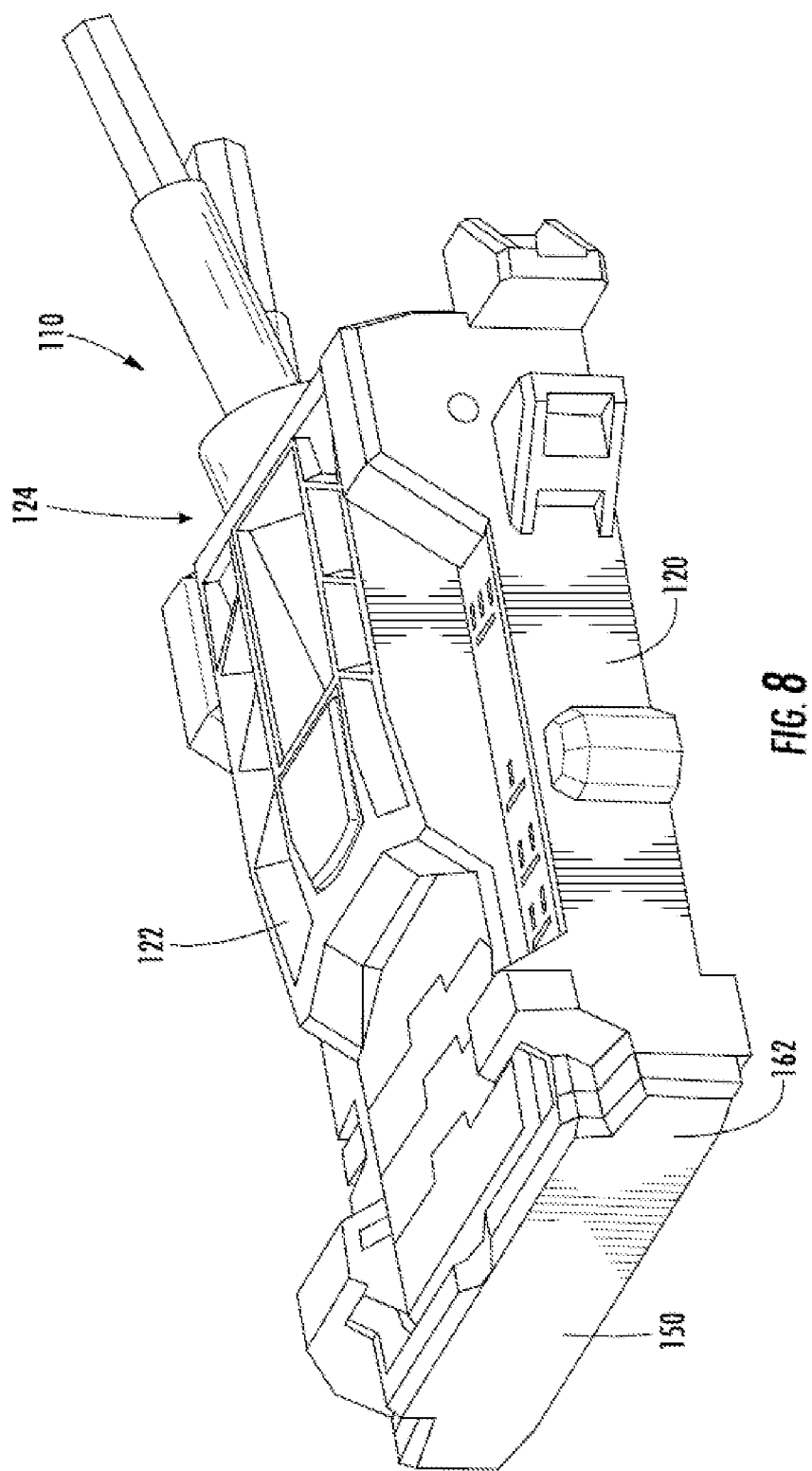
FIG. 8 is a perspective view of a pocket hole jig according to another embodiment of the invention with a fence in a raised position.
Figure 9:
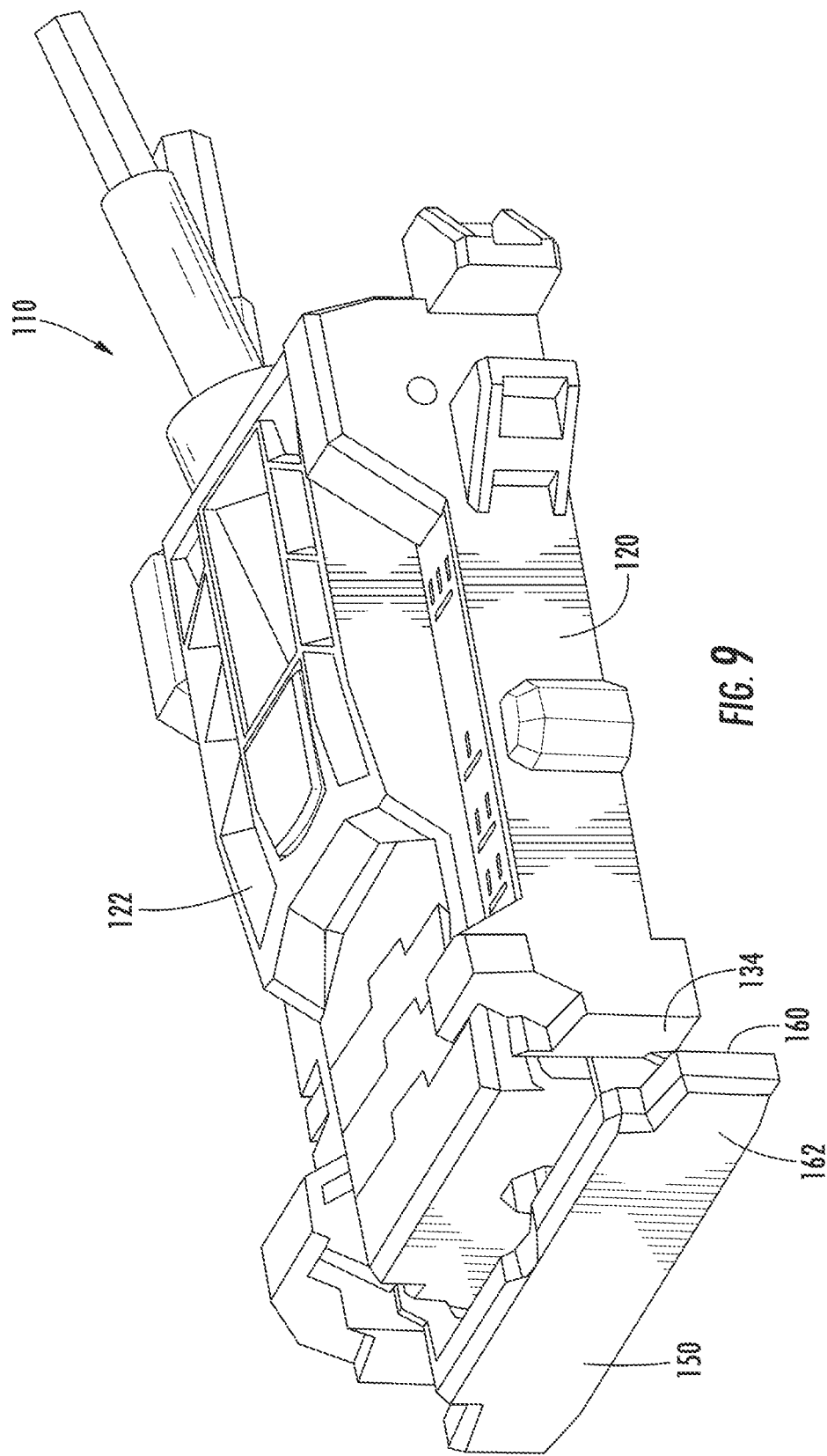
FIG. 9 is a perspective view of the pocket hole jig of FIG. 8 with the fence in a lowered position.
Figure 10:
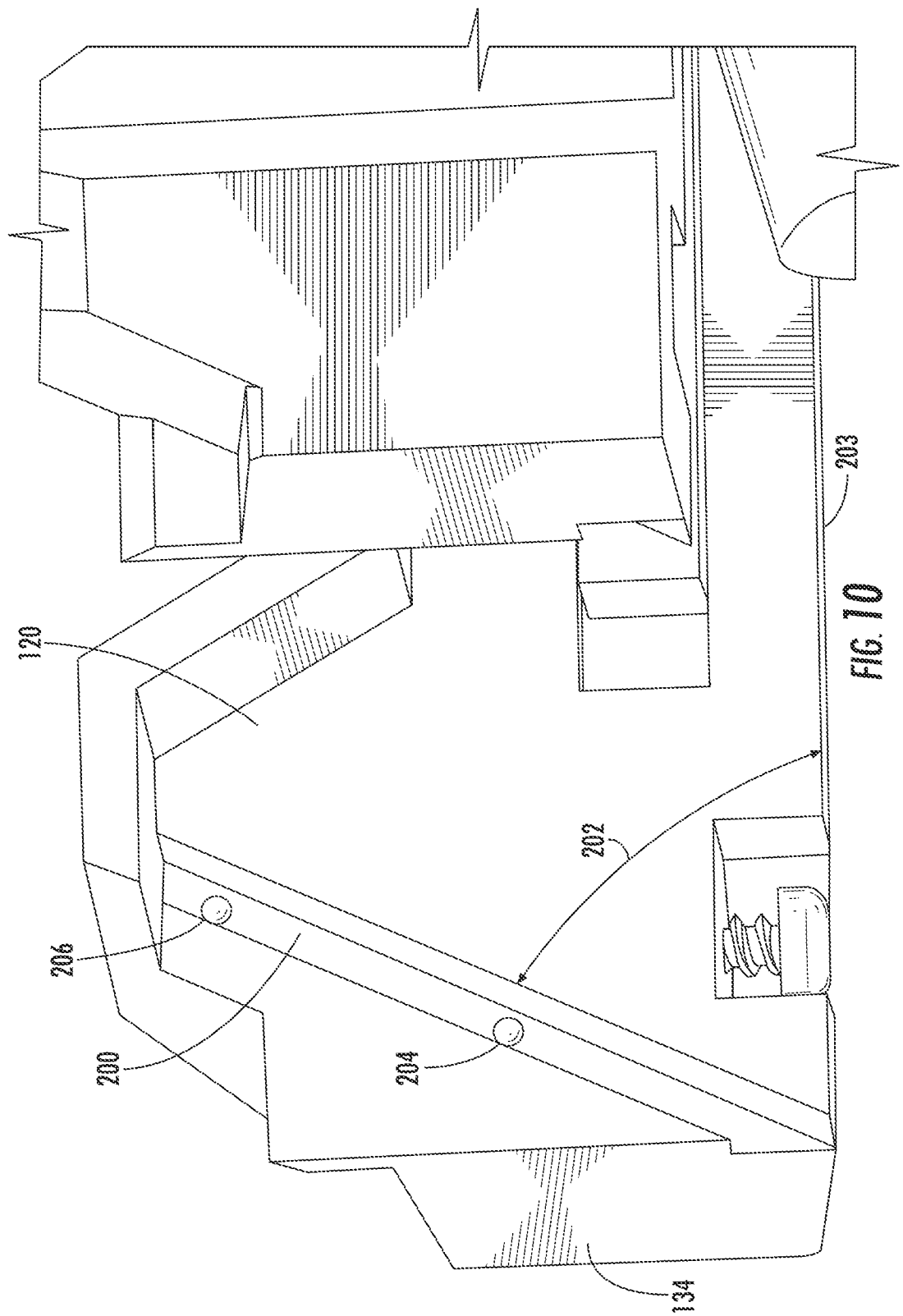
FIG. 10 is a perspective view of a portion of the pocket hole jig of FIG. 8.
Figure 11:
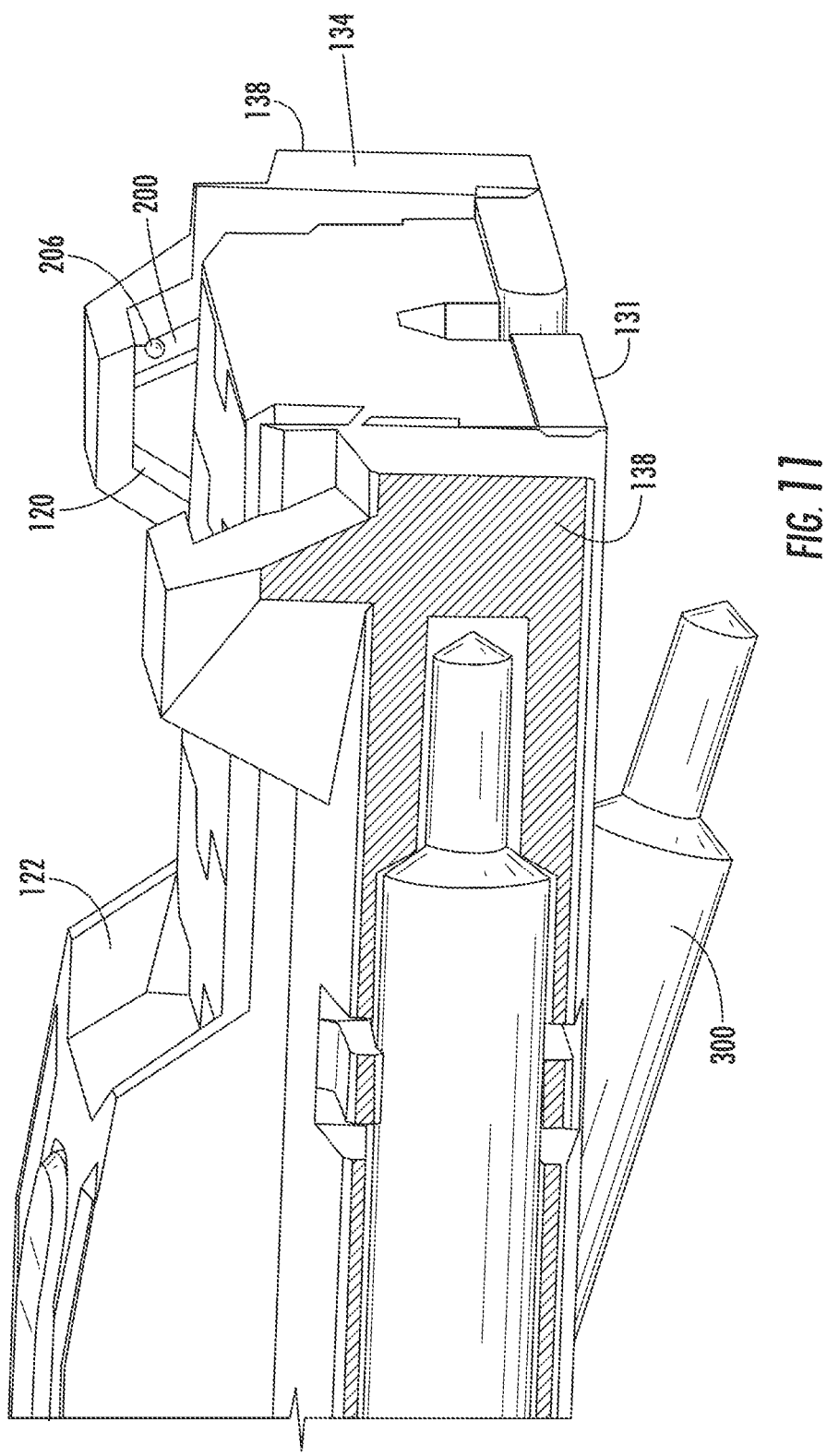
FIG. 11 is an alternative perspective view of a portion of the pocket hole jig of FIG. 8.

FIGS. 8-14 illustrate a jig 110 according to another embodiment. The jig 110 includes features that are similar to the jig 10 of FIGS. 8-14 and like components have been given like reference numbers plus 100. The jig 110 includes a base 120 with a base plate 131 and lateral side walls 138 (FIG. 11). A body 122 is disposed between the side walls 138 and movable relative to the base 120. The jig 110 also includes a fence 150 (FIGS. 8 and 9). The fence 150 is movable between a first or raised position (FIG. 8) and a second or lowered position (FIG. 9). The fence 150 includes a rearward facing contact surface 160 and a forward facing contact surface 162 opposite the contact surface 160. The rearward contact surface 160 occupies a first position when the fence 150 is in the raised position and a second position when the fence 150 is in the lowered position. The second position is forward of the first position.

The fence 150 is used in the lowered position when there is a free end 54 (FIGS. 6 and 13) on the work piece 18 over which to hang the fence 150. The fence 150 is moved to the raised position when there is no free end 68 (FIGS. 7 and 17) over which to hang the fence 150 and the forward facing contact surface 162 of the fence 150 then abuts the workpiece 70 to properly position the jig 110.

Referring to FIGS. 10 and 11, the body 120 includes a groove 200 at the front end 134 of the base 120 at each side of the base 120. The grooves 200 are at an inclined angle 202 relative to a flat bottom surface 203 of the base 120. Each groove 200 includes a lower detent 204 and an upper detent 206.

Figure 12:
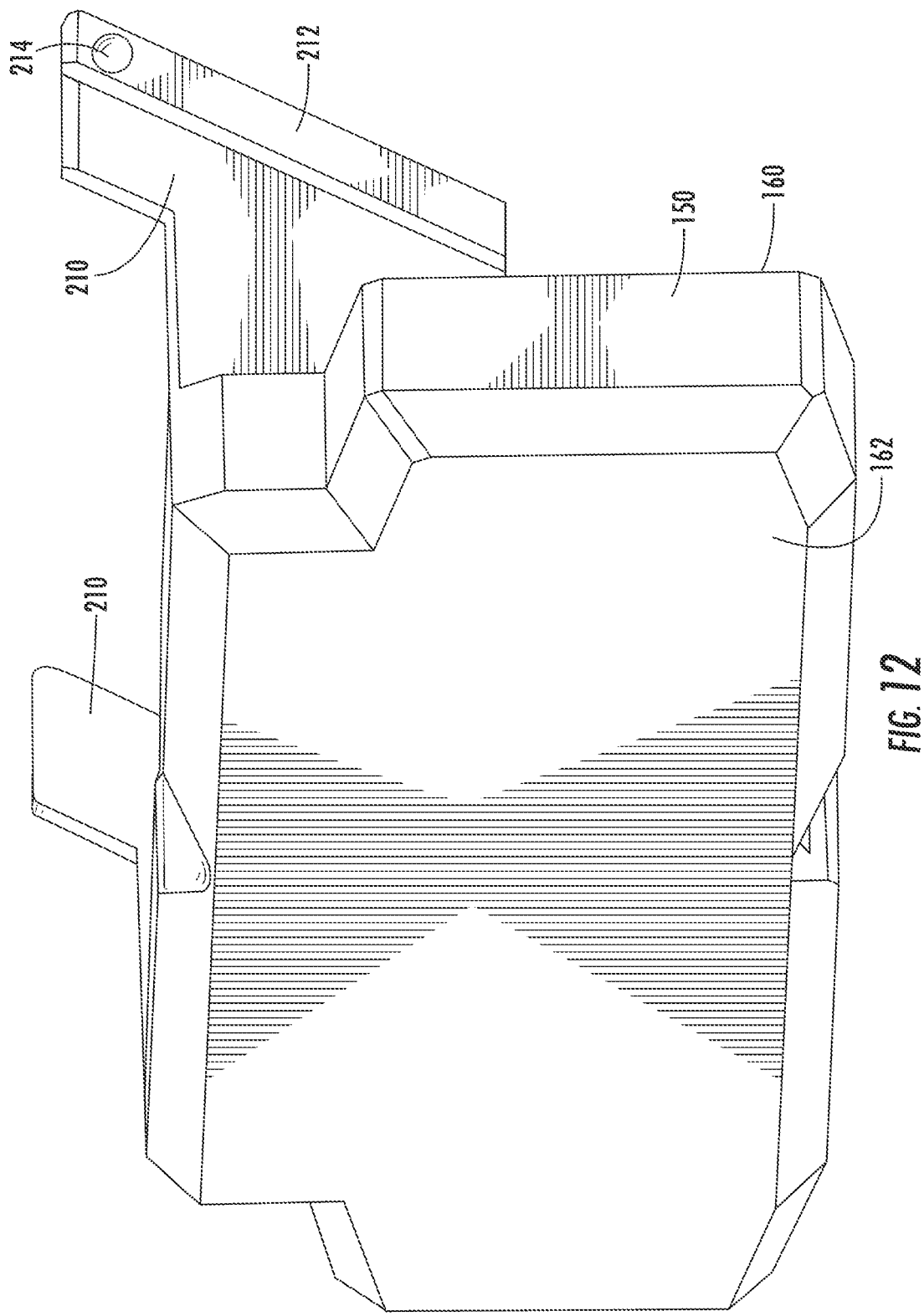
FIG. 12 is a perspective view of the fence of the pocket hole jig of FIG. 8.

Referring to FIG. 12, the fence 150 includes legs 210. Each leg 210 includes a rail 212 that is received in one of the grooves 200 of the base 120. A ball-shaped projection 214 is located on each rail 212. Referring to FIG. 10, when the fence 150 (fence 50 in FIGS. 4 and 5) is in the raised position, the ball-shaped projections 214 (ball-shaped projections 67 in FIGS. 4 and 5) are received in the upper detents 206 (upper detents 69 in FIG. 4) to hold the fence 150 (fence 50 in FIGS. 4 and 5) in the raised position. The ball-shaped projections 214 are received in the lower detents 204 when the fence 150 is in the lowered position to hold the fence 150 in the lower position. The rails 212 being received the grooves 200 guide movement of the fence 150 between the raised and lowered positions.

Figure 13:
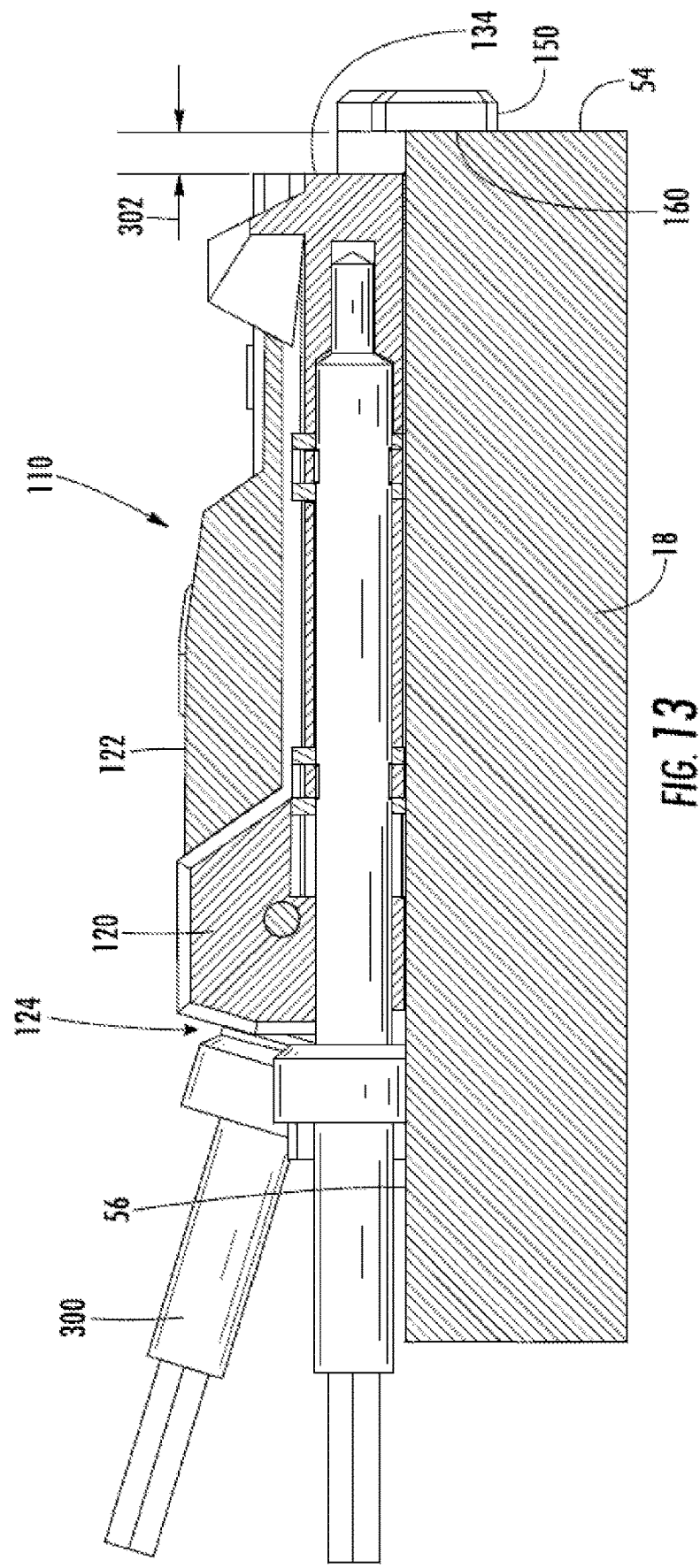
FIG. 13 is a side view of the pocket hole jig of FIG. 8 with the fence in the lowered position.
Figure 14:
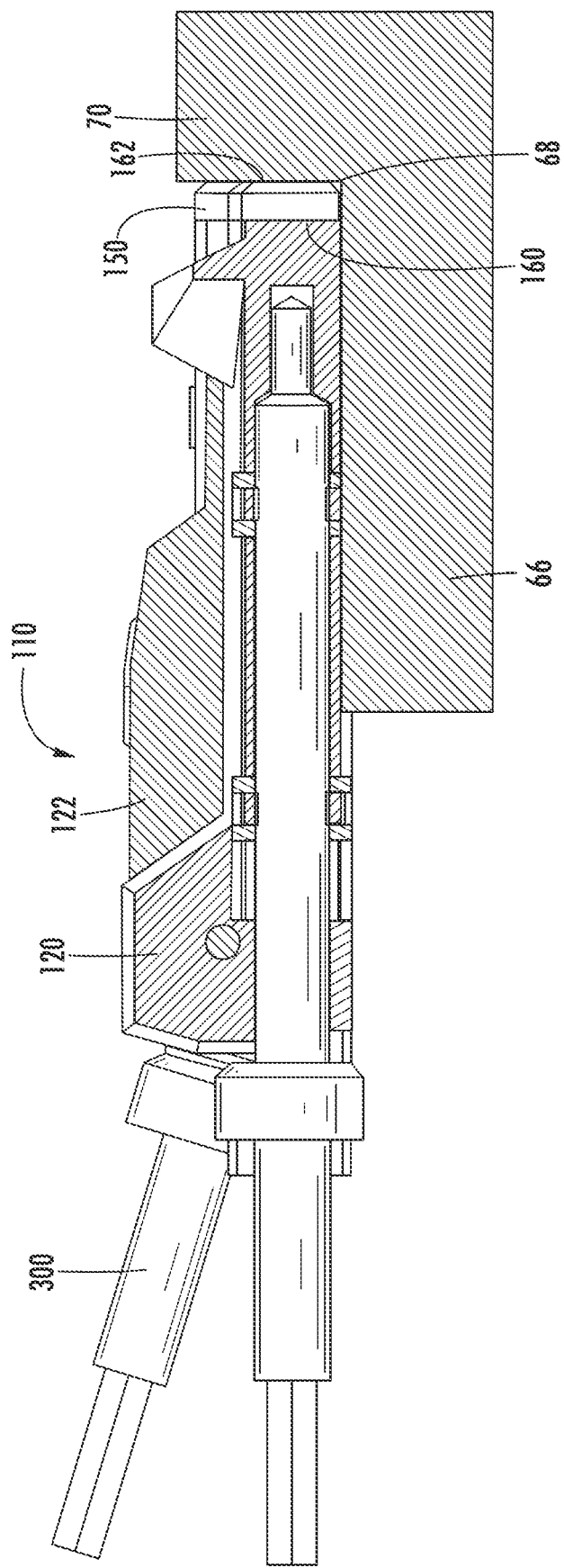
FIG. 14 is a side view of the pocket hole jig of FIG. 8 with the fence in the raised position.

Referring to FIGS. 13-14, in operation, when the fence 150 is in the lowered position (FIG. 13) the jig 110 can be used for locating holes 12, 16 (FIG. 6). The jig 110 is placed on the face 56 of the workpiece 18 so that the base 120 rests on the face 56. The distance 52 (FIG. 6) is set by the fence 150. More specifically, the contact surface 160 of the fence 150 is placed in contact with the end 54 of the workpiece 18. This positions the jig 110 the correct distance 52 from the end 54. The user can then drill the hole 12 (FIG. 6) by inserting a drill bit 300 (FIG. 11) through the drill bit aperture 124 and advancing the drill bit 300 the desired distance. To drill another hole 16, the user repositions the jig 110 on the face 56 to drill the hole 16 in the same manner. Thus, the fence 150 advantageously allows multiple pocket holes 12, 16 to be drilled at the same distance 52 from the end 54, and the distance 52 is properly calibrated such that the pocket holes 12, 16 intersect the end 54 of the workpiece 18.

In some applications, such as that illustrated in FIGS. 7 and 14, a workpiece 66 does not have a free end 68 over which to hang the fence 150 like the end 54 of the workpiece 18 of FIG. 6. In such applications, the fence 150 is placed in the raised position shown in FIG. 14. With the fence 150 in the raised position, the forward facing contact surface 162 of the fence 150 abuts the workpiece 70 to position the apertures 12, 16 at the appropriate distance 52 (FIG. 7).

The fence 150 is moved between the raised and lowered positions by sliding the fence 150 in the grooves 200. The ball-shaped projections 214 and the recesses 204 and 206 releasably retain the fence 150 in the desired position. Also, the angle 202 (FIG. 10) of the grooves 200 causes the rearward facing contact surface 160 of the fence 150 to be positioned a distance 302 (FIG. 13) from the front surface 134 of the base 120 when in the lowered position. The distance 302 is equal to the thickness of the fence 150 (i.e. the perpendicular distance between the contact surfaces 160, 162) so that the jig positions the holes 12, 16 the same distance from the ends 54, 68 of the workpieces 18, 66 regardless whether the there is a free end over which to hang the fence 150.

Various features of the invention are set forth in the following claims.

What is claimed is:

1. A pocket hole jig for locating pocket holes in a workpiece, the pocket hole jig comprising:
   a base including a base plate and first and second lateral side walls extending along the base plate;
   a body disposed between the first and second lateral side walls and slidable along the base in a first direction and a second direction opposite the first direction, the body including a drill bit aperture angled relative to the base plate; and
   a fence movable between a raised position and a lowered position, the fence including a first contact surface and a second contact surface opposite the first contact surface, the fence pivotally coupled to the base,
   wherein, with the body in a position relative to the base, the first contact surface is engageable with an end of the workpiece with the fence in the lowered position to place the base a predetermined distance from the end of the workpiece,
   wherein, with the body in the position relative to the base, the second contact surface is engageable with a face of a second workpiece abutting the end of the workpiece with the fence in the raised position to place the base the predetermined distance from the end of the workpiece,
   wherein the fence is pivotally coupled to the base about a pivot axis, and
   wherein the pivot axis extends in a direction perpendicular to the first direction and the second direction.

2. The pocket hole jig of claim 1, wherein
   at least one of the base and the fence further includes an indentation, and
   at least one of the fence and the base further includes a corresponding ball-shaped projection engageable with the indentation.

3. The pocket hole jig of claim 2, wherein
   the base includes the indentation, and
   the fence includes the ball-shaped projection engageable with the indentation.

4. A pocket hole jig for locating pocket holes in a workpiece, the pocket hole jig comprising:
   a base including a first end, a second end, and a longitudinal axis extending therebetween, the base further including a drill bit aperture positioned proximate the first end and extending through a portion of the base, the drill bit aperture oriented at an acute angle relative to the longitudinal axis; and
   a fence pivotally coupled to the base proximate the second end of the base, the fence including a contact surface, the fence pivotal about an axis transverse to a longitudinal axis of the drill bit aperture,
   wherein the fence includes a first leg proximate a first side of the base and a second leg proximate a second side of the base.

5. The pocket hole jig of claim 4, wherein the fence is pivotal between a lowered position and a raised position.

6. The pocket hole jig of claim 5, wherein the contact surface of the fence extends below a bottom surface of the base when in the lowered position.

7. The pocket hole jig of claim 5, wherein the contact surface of the fence is coplanar with a front surface of the base when the fence is in the lowered position.

8. The pocket hole jig of claim 4, wherein the first leg and the second leg are co-rotatable.

9. The pocket hole jig of claim 5, further comprising a spring configured to bias the fence toward the raised position or toward the lowered position.

10. The pocket hole jig of claim 9, wherein the spring is an over-center spring.

11. A pocket hole jig for locating pocket holes in a workpiece, the pocket hole jig comprising:
    a base including a forwardmost end defining a generally planer front surface and a drill bit aperture positioned opposite the forwardmost end, the drill bit aperture oriented at an acute angle relative to a longitudinal axis of the base; and a fence having a contact surface pivotally coupled to the base proximate the forwardmost end, the contact surface pivotal between a raised position and a lowered position, the contact surface disposed rearward of the forwardmost end when in the raised position,
wherein the contact surface includes a recess aligned with a longitudinal axis of the drill bit aperture.

12. The pocket hole jig of claim 11, wherein the contact surface is coplanar with the forwardmost end when in the lowered position.

13. The pocket hole jig of claim 11, wherein the recess is curved.

14. The pocket hole jig of claim 11, wherein the contact surface is located below a bottom surface of the base when the contact surface is in the lowered position.

15. The pocket hole jig of claim 11, wherein the contact surface is pivotal along an axis oriented perpendicular to a longitudinal axis of the drill bit aperture.

16. The pocket hole jig of claim 11, wherein the fence further includes a first leg and a second leg.

17. The pocket hole jig of claim 11, further comprising a detent configured to secure the contact surface in the raised position or the lowered position.

\* \* \* \* \*